United States Patent [19]

Takasaki et al.

[11] Patent Number: 4,574,338
[45] Date of Patent: Mar. 4, 1986

[54] LIGHT ASSEMBLY WITH FLEXED THERMOPLASTIC FRESNEL LENS

[75] Inventors: Masaru Takasaki, Ebina; Masutoshi Aoyama, Yokohama, both of Japan

[73] Assignee: Nissan Motor Co., Ltd., Yokohama, Japan

[21] Appl. No.: 658,220

[22] Filed: Oct. 5, 1984

[30] Foreign Application Priority Data

Oct. 11, 1983 [JP] Japan ................................ 58-188359

[51] Int. Cl.$^4$ ............................................... F21V 5/00
[52] U.S. Cl. ...................................... 362/278; 362/61; 362/189; 362/320; 362/377
[58] Field of Search ................. 362/278, 320, 337, 61, 362/189

[56] References Cited

U.S. PATENT DOCUMENTS

| 2,920,184 | 1/1960 | Kessler | 362/320 X |
| 3,188,513 | 6/1955 | Hansler | 362/278 X |
| 3,711,704 | 1/1973 | Spiteri | 362/337 |
| 3,745,677 | 7/1973 | Moran | 362/320 X |
| 4,439,817 | 3/1984 | Aton | 362/320 X |

FOREIGN PATENT DOCUMENTS

| 549332 | 4/1932 | Fed. Rep. of Germany | 362/320 |
| 54-36627 | 11/1979 | Japan. | |
| 55-2004 | 1/1980 | Japan. | |

*Primary Examiner*—Peter A. Nelson
*Attorney, Agent, or Firm*—Schwartz, Jeffery, Schwaab, Mack, Blumenthal & Evans

[57] ABSTRACT

Herein disclosed is an inexpensive light assembly which is easy to be produced and has aesthetic appearance. The assembly comprises a housing of thermoplastic resin having a convexly curved mouth, an electric bulb disposed in the housing, a lens of thermoplastic resin assuming a flat shape when no external stress is applied thereto, the lens being so constructed as to exhibit its desired optical performance when flexed by a given degree, and means for securing the lens to the mouth of the housing while flexing the same by the given degree.

18 Claims, 15 Drawing Figures

LIGHT ASSEMBLY WITH FLEXED THERMOPLASTIC FRESNEL LENS

BACKGROUND OF THE INVENTION

The present invention relates in general to a light assembly, and more particularly to a light assembly for a motor vehicle, which generally comprises a housing of plastics, an electric bulb disposed in the housing and a lens of plastics mounted to the mouth of the housing.

SUMMARY OF THE INVENTION

It is an object of the present invention to provide an inexpensive light assembly which generally comprises a housing of thermoplastic resin, an electric bulb disposed in the housing and a lens of thermoplastic resin mounted to the mouth of the housing.

It is another object of the present invention to provide a light assembly which is easy to produce and has aesthetic appearance.

It is still another object of the present invention to provide a light assembly which is compact in size and simple in construction.

According to the present invention, there is provided a light assembly which comprises a housing of thermoplastic resin having a convexely curved mouth, an electric bulb disposed in the housing, a lens of thermoplastic resin assuming a flat shape when no external stress is applied thereto, the lens being so constructed as to exhibit its desired optical performance when flexed by a given degree, and means for securing the lens to the mouth of the housing while flexing the same by the given degree.

BRIEF DESCRIPTION OF THE DRAWINGS

Other objects and advantages of the present invention will be apparent from the following description when taken in conjunction with the accompanying drawings, in which.

DESCRIPTION OF PRIOR ART LIGHT ASSEMBLY

Figure 1:
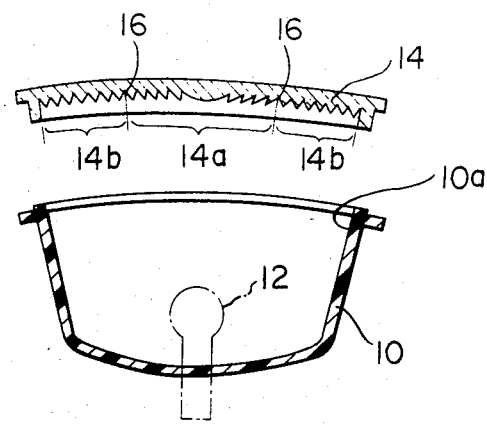
FIG. 1 is an exploded sectional view of a conventional light assembly including one lens.
Figure 2:
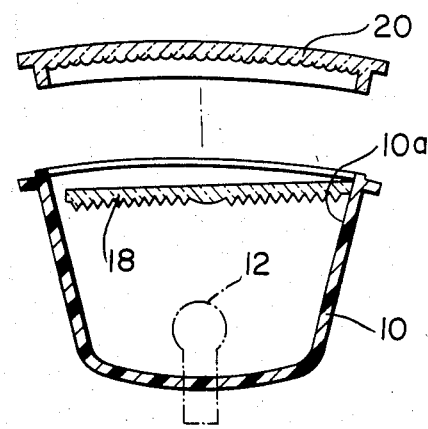
FIG. 2 is an exploded sectional view of another conventional light assembly including two lenses.
Figure 3:
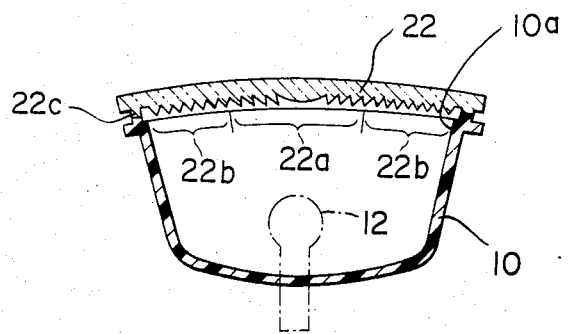
FIG. 3 is a sectional view of a light assembly of a first embodiment of the present invention.

Prior to describing in detail the invention, two prior art light assemblies will be outlined with reference to FIGS. 1 and 2 in order to clarify the invention.

Referring to FIG. 1, there is shown one prior art light assembly which is disclosed in Japanese Utility Model Application First Publication No. 55-2004. The light assembly disclosed in the publication comprises a housing 10 of plastics, an electric bulb 12 disposed in the housing 10 and a flexed lens 14 of plastics mounted to the housing 10. The mouth 10a of the housing 10 is convexly curved to neatly mount thereon the flexed lens 14. The lens 14 has been already flexed before attaching to the housing 10. The lens 14 shown is of a fresnel lens which comprises a light refraction portion 14a located at the center portion of the lens and a light refraction and reflection portion 14b located about the light refraction portion 14a. However, production of this type lens 14 is not easy because of the complicated configuration of the lens surface. That is, for the production of such fresnel lens 14, it is usual to employ separated moulds each having a highly complex and highly finished work surface the configuration of which is the mirror image of the portion 14a or 14b of the lens 14 which is to be produced. This production method induces inevitable formation of an unsightly line 16 on the lens 14 at the boundary between the two portions 14a and 14b. For these reasons, the light assembly has not satisfied the users.

Referring now to FIG. 2, there is shown another prior art light assembly which is disclosed in Japanese Utility Model Application Second Publication No. 54-36627. The light assembly of this prior art has two lenses 18 and 20. The lens 18 is of a flat type fresnel lens of plastics and disposed in the mouth of the housing 10. The other lens 20 is of a fisheye lens of plastics and mounted to the mouth of the housing 10 in a manner to cover the flat fresnel lens 18. Production of these lens 18 and 20 is easy as compared with the above-mentioned lens 14 because they can be produced separately with simple moulds. However, this type light assembly has a bulky or unsightly elongated construction because of the need for considerable distance between the electric bulb 12 and the flat lens 18 for protecting the latter from heat.

DETAILED DESCRIPTION OF THE INVENTION

In the following, improved light assemblies according to the present invention will be described in detail with reference to FIGS. 3 to 15, which are free of the above-mentioned drawbacks. In the drawings, identical parts to those of FIGS. 1 and 2 are designated by the same numerals.

Referring to FIGS. 3 to 7, there is shown a first embodiment of the present invention. The light assembly of this embodiment comprises a housing 10 of thermoplastic resin, an electric bulb 12 disposed in the housing 10 and a fresnel lens 22 of thermoplastic resin mounted to the housing 10. Like the lens 14 of FIG. 1, the fresnel lens 22 comprises a light refraction portion 22a located at the center portion of the lens and a light refraction and reflection portion 22b located about the light refraction portion 22a. It is be noted that the lens 22 of this embodiment is flat in shape before being mounted to the housing 10, as is understood from FIG. 4. The inboard surface of the flat lens 22 is formed at its peripheral portion with a rectangular rim portion 22c. The flat lens 22 is so constructed as to form a desired fresnel lens when flexed by a predetermined degree.

Figure 4:
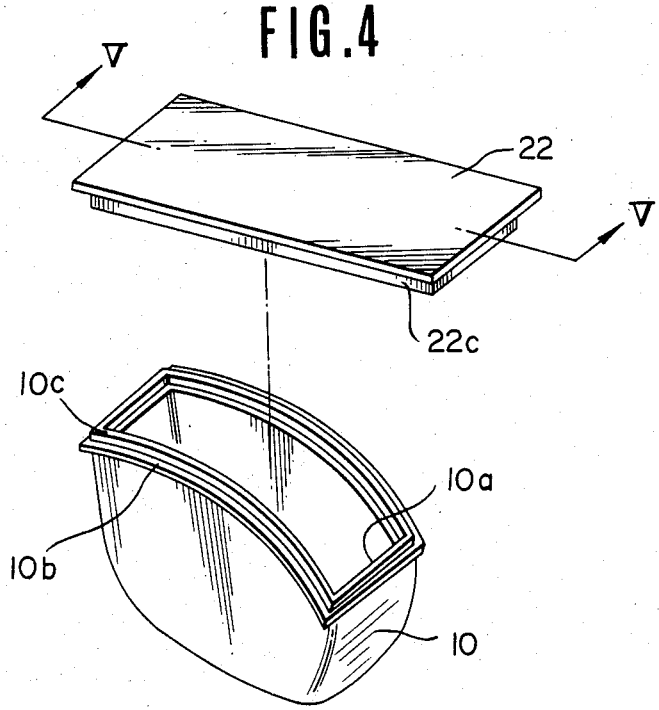
FIG. 4 is an exploded perspective view of the light assembly of the first embodiment.
Figure 5:
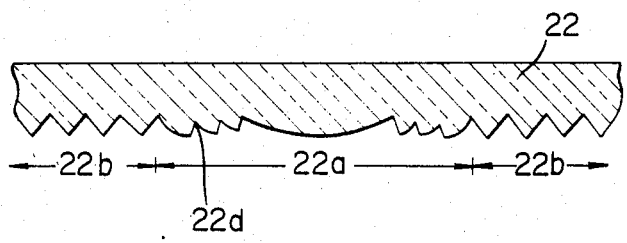
FIG. 5 is an enlarged sectional view of the center portion of the lens employed in the first embodiment, which view is taken along the line V—V of FIG. 4.

As is best seen from FIG. 4, the convexly curved mouth 10a of the housing 10 is formed with a rectangular flange 10b. The flange 10b is formed at its peripheral portion with a rectangular rim 10c which is sized and constructed to match with the rim portion 22c of the fresnel lens 22.

Figure 6:
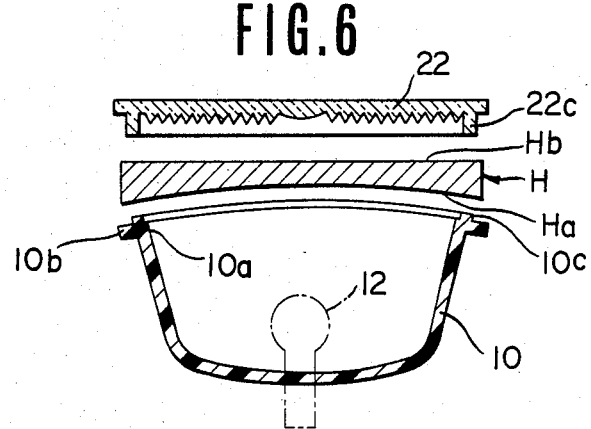
FIGS. 6 and 7 are sectional views of the light assembly, depicting the process of manufacturing the light assembly of the first embodiment.
Figure 7:
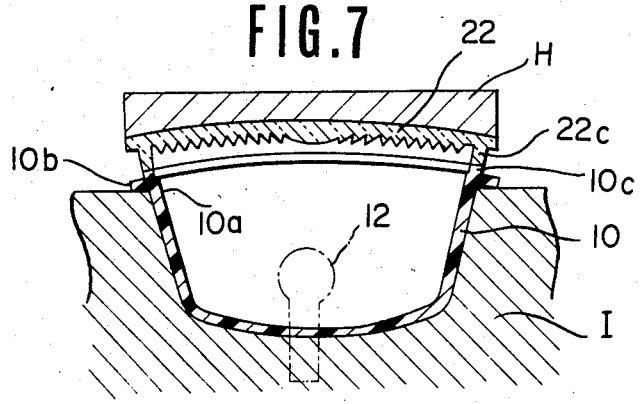

In order to assemble these parts, the following steps are employed, which are depicted by FIGS. 6 and 7. In these drawings, a pressing jig is designated by H. A suitable heater means (not shown) is arranged in the jig H for heating the same. As shown, one side of the jig H has a concave surface Ha matching with the convex surface of the housing mouth 10a, while, the other side of the same has a flat surface Hb. First, as is understood from FIG. 6, the heated jig H is put on the housing 10 with the concave surface Ha intimately contacting with the rim 10c of the housing 10, and then the flat-conditioned lens 22 is put on the jig H with the rim 22c intimately contacting with the flat surface Hb of the jig H. With this, the rim 10c of the housing 10 and the rim 22c of the lens 22 are melted. Then, as is seen from FIG. 7, the housing 10 is put in a holder I and the lens 22 is put on the housing 10 with the melted rim 22c mated with the melted rim 10c of the housing 10, and then the jig H which is somewhat cooled is put on the lens 22 with the concave surface Ha intimately contacting with the outer surface of the lens 22. By the weight of the jig H and the heat from the same, the lens 22 becomes flexed to have a convex outer surface matching with the concave surface Ha of the jig H, and finally, the mating rims 10c and 22c are tightly bonded. With these steps, the lens 22 is secured to the mouth 10a of the housing 10 with the flexed configuration thereof fixed.

As is described hereinabove, in this first embodiment, the flat-conditioned lens 22 is constructed to have a desired fresnel lens when flexed by a predetermined degree, that is, when secured to the convex mouth 10a of the housing 10. Thus, as will be understood from FIG. 5, each groove 22d (only one is designated) formed on the flat-conditioned fresnel lens 22 has a cut angle which is somewhat greater than that provided when the lens 22 is flexed. This means that the flat-conditioned fresnel lens 12 can be produced with a simple mould. That is, in this embodiment, the troublesome separated moulds are unnecessary.

Figure 8:
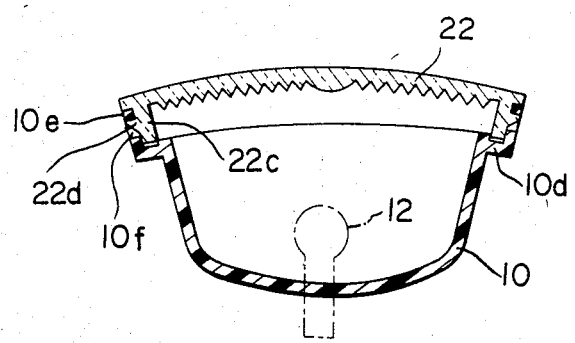
FIG. 8 is a sectional view of a light assembly of a second embodiment of the present invention.
Figure 9:
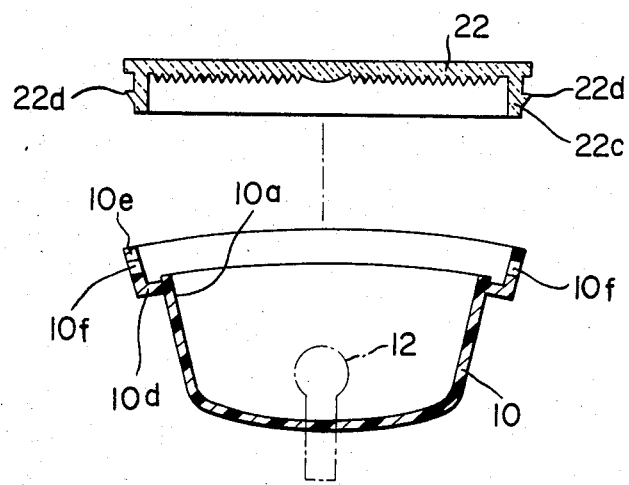
FIG. 9 is an exploded sectional view of the light assembly of the second embodiment.

Referring to FIGS. 8 and 9, there is shown a second embodiment of the present invention. The light assembly of this embodiment is assembled by locking means which is provided on the housing 10 and the lens 22. That is, the afore-mentioned heating and pressing technique is not necessary in the second embodiment. As is best seen from FIG. 9, the inboard surface of the flat-conditioned fresnel lens 22 is formed at its peripheral portion with a somewhat higher rim 22c. A plurality of spaced projections 22d are formed on the outside surface of the rim 22c. Each projection 22d has a generally triangular cross section, as shown. While, the mouth 10a of the housing 10 is somewhat expanded to define a lens receiving structure which comprises a lateral flange 10d and an upright flange 10e, as shown. The upright flange 10e is formed with a plurality of spaced openings 10f. As will be seen from FIG. 8, the lens receiving structure of the housing 10 is so sized and constructed as to snugly receive therein the rim 22c of the lens 22 while flexing the same to the desired degree. Assembly of these parts is performed by only thrusting the rim 22c of the lens 22 into the lens receiving structure of the housing 10. Upon proper assembling, the projections 22d are lockingly engaged with the corresponding openings 10f of the upright flange 10e of the housing 10, as shown in FIG. 8. Because of the triangular shape of each projection 22d, the thrust-in motion of the lens 22 to the lens receiving structure of the housing 10 is smoothly carried out.

Figure 10:
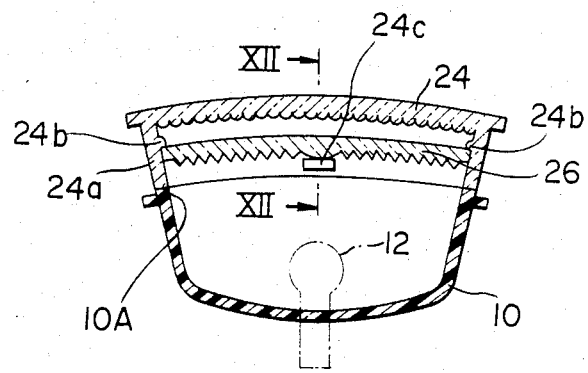
FIG. 10 is a sectional view of a light assembly of a third embodiment of the present invention.
Figure 11:
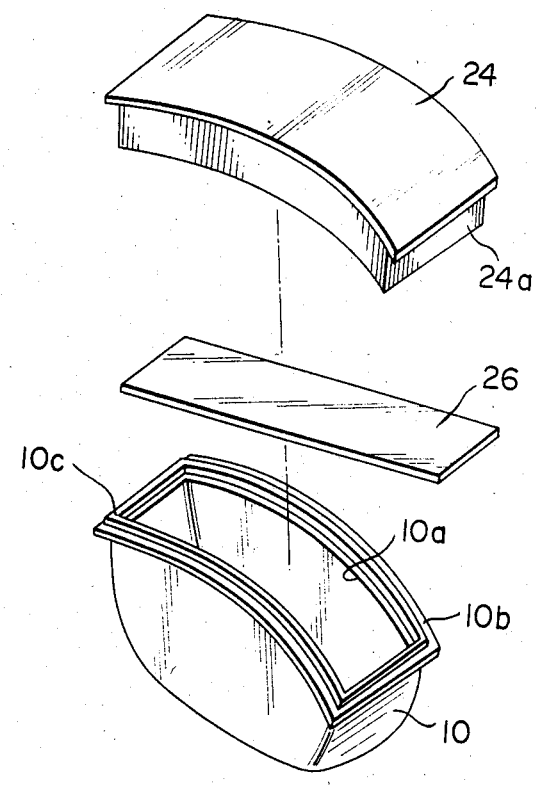
FIG. 11 is an exploded perspective view of the light assembly of the third embodiment.
Figure 12:
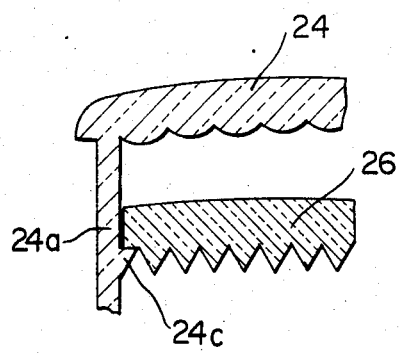
FIG. 12 is an enlarged sectional but partial view taken along the line XII—XII of FIG. 10.

Referring to FIGS. 10 to 12, there is shown a third embodiment of the present invention, which includes two lenses. The light assembly of this embodiment comprises a housing 10 of thermoplastic resin, an electric bulb 12 disposed in the housing 10 and a double lens assembly of thermoplastic resin mounted to the housing 10. The construction of the housing 10 is substantially the same as that of the first embodiment of FIG. 3. The double lens assembly comprises a fisheye lens 24 and a fresnel lens 26 which are coaxially arranged as shown in FIG. 10. The fisheye lens 24 has been already flexed before being mounted to the housing 10, while, the fresnel lens 26 is flat in shape under non-stressed condition. The fisheye lens 24 is integrally formed with a rim portion 24a about the peripheral portion thereof, as is best seen from FIG. 11. The height of the rim portion 24a is somewhat increased to provide a lens receiving structure which comprises axially spaced two groups of projections 24b and 24c integrally formed on the inside surface of the rim portion 24a. Getting over the projections 24c, the flat-conditioned fresnel lens 26 is thrust into the lens receiving structure of the fisheye lens 24, so that upon proper mounting of the fresnel lens 26 in the structure, it is flexed by a desired degree with the peripheral edges thereof lockingly held by the projections 24b and 24c, as is understood from FIG. 10. Preferably, the fresnel lens 26 is somewhat heated before attaching to the fisheye lens 24 in order to facilitate the flection of the fresnel lens 26. For easy thrust-in motion of the lens 26, each of the projections 24c is constructed to have a triangular cross section as is understood from FIG. 12. The double lens assembly thus constructed in the above-mentioned manner is welded or bonded to the mouth 10 of the housing 10 in substantially the same manner as in the case of the first embodiment of FIGS. 6 and 7.

It is to be noted that in this third embodiment, the fresnel lens 26 positioned near the electric bulb 12 is flexed with its center portion curved away from the bulb 12. With this arrangement, the axial dimension of the light assembly can be reduced by a length corresponding to the height of the center portion of the fresnel lens 26. This is not expected from the prior art light assembly of FIG. 2.

Figure 13:
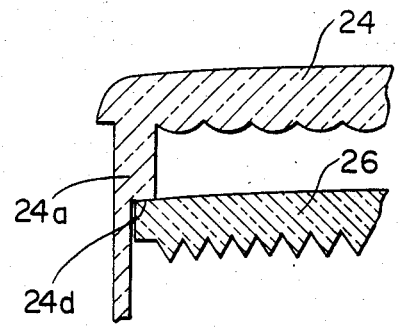
FIG. 13 is a view similar to FIG. 12, but showing a fourth embodiment of the present invention.

Referring to FIG. 13, there is shown a fourth embodiment of the present invention, which is a slight modification of the third embodiment of FIG. 10. In this fourth embodiment, the rim portion 24a of the fisheye lens 24 is formed at its inside surface with a step 24d to which the fresnel lens 26 is bonded or welded.

Figure 14:
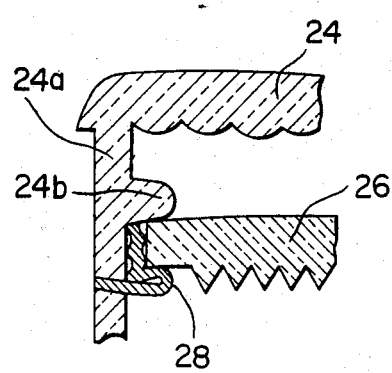
FIG. 14 is a view similar to FIG. 12, but showing a fifth embodiment of the present invention.
Figure 15:
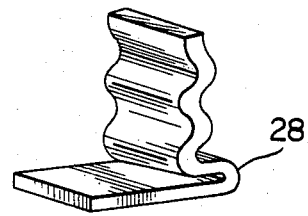
FIG. 15 is a perspective view of a clip employed in the fifth embodiment.

Referring to FIGS. 14 and 15, there is shown a fifth embodiment of the present invention, which is also a modification of the third embodiment of FIG. 10. In this fifth embodiment, the rim portion 24a of the fisheye lens 24 is formed at its inside surface with a plurality of projections 24b, and a plurality of clips 28 are fixed to the rim portion 24a near the projections 24b to form therebetween a lens receiving structure. Preferably, fixing of the clips 28 to the rim portion 24a of the fisheye lens 24 is effected by way of "insert moulding technique".

Various other modifications and variations of the present invention are possible in light of the above teaching. It is to be understood, therefore, that within the scope of the appended claims, the present invention may be practiced other than as specifically described herein.

What is claimed is:

1. A light assembly comprising:
   a housing of thermoplastic resin having a convexly curved mouth;
   an electric bulb disposed in said housing;
   a fresnel lens of thermoplastic resin, wherein said fresnel lens comprises an originally flat lens which is flexed by a given degree to form said fresnel lens; and
   means for securing said lens to the mouth of said housing while flexing same by said given degree.

2. A light assembly as claimed in claim 1, in which the curvature of said lens is substantially in compliance with the shape of the convexly curved mouth of said housing.

3. A light assembly as claimed in claim 2, in which said means comprises:
   a rim portion formed on said lens; and
   another rim portion formed on the peripheral portion of said mouth of said housing, said rim portions being welded to each other.

4. A light assembly as claimed in claim 2, in which said means comprises a locking structure by which said lens and said mouth are lockingly engaged.

5. A light assembly as claimed in claim 4, in which said locking structure comprises:
   a plurality of projections formed on a rim portion of said lens; and
   a plurality of openings formed in the peripheral portion of the mouth of said housing, said projections being lockingly engaged with said openings thereby to achieve locking engagement between said lens and said housing.

6. A light assembly as claimed in claim 5, in which said mouth of said housing is formed with a lens receiving structure which comprises a lateral flange extending radially outwardly from the peripheral portion of the mouth, and an upright flange extending upwardly from said lateral flange, said lens receiving structure being so sized and constructed as to snugly receive therein the rim portion of said lens.

7. A light assembly as claimed in claim 6, in which each of said projections is constructed to have a triangular cross section for facilitating insertion of said lens into said lens receiving structure.

8. A light assembly as claimed in claim 2, in which said means comprises another lens of thermoplastic resin which has a rim portion, said rim portion being constructed to form therein a lens receiving structure into which said originally flat lens is received while being flexed, said rim portion being welded at its leading end to the peripheral portion of the mouth of said housing.

9. A light assembly as claimed in claim 8, in which said lens receiving structure of said another lens comprises axially spaced two groups of projections which are integrally formed on the inside surface of said rim portion of said another lens.

10. A light assembly as claimed in claim 8, in which said lens receiving structure of said another lens comprises a step which is formed at the inside surface of said rim portion to seat thereon the originally flat lens.

11. A light assembly as claimed in claim 10, in which said originally flat lens is welded to said step of the rim portion of the another lens.

12. A light assembly as claimed in claim 8, in which said lens receiving structure comprises a plurality of projections integrally formed on the inside surface of said rim portion, and a plurality of clips fixed to said rim portion near said projections.

13. A method for producing a light assembly, comprising the steps of:
    preparing a housing of thermoplastic resin having a convexly curved mouth;
    flexing a flat lens of thermoplastic resin by a given degree to form a fresnel lens; and
    securing said lens to the mouth of said housing during said flexing step.

14. A method as claimed in claim 13, wherein said securing step comprises welding said flexed lens to said housing.

15. A method as claimed in claim 14, wherein said securing step comprises the substeps of heating the attaching surfaces of said housing and said lens, heating said flat lens and flexing said heated flat lens in a concave manner to align with said convexly curved mouth of said housing.

16. A method as claimed in claim 13, wherein said securing step comprises lockingly engaging a plurality of projections of said lens with a plurality of openings of said housing.

17. A method as claimed in claim 13, wherein said flexing step comprises heating said thermoplastic flat lens and concavely bending said heated lens.

18. A method as claimed in claim 13, wherein said flexing step comprises inserting said flat lens into a previously flexed lens assembly and lockingly mounting the peripheral edges of said flexed lens by a plurality of projections.

* * * * *